(12) United States Patent
Chiasson et al.

(10) Patent No.: US 11,176,270 B2
(45) Date of Patent: Nov. 16, 2021

(54) APPARATUS AND METHOD FOR IMPROVING DATA SECURITY

(71) Applicant: DELL PRODUCTS, LP, Round Rock, TX (US)

(72) Inventors: Shane Michael Chiasson, Austin, TX (US); Aditi R. Satam, Austin, TX (US); Bijan Noorbakhsh, Austin, TX (US); Thomas Cantwell, Liberty Hill, TX (US)

(73) Assignee: Dell Products L.P., Round Rock, TX (US)

( * ) Notice: Subject to any disclaimer, the term of this patent is extended or adjusted under 35 U.S.C. 154(b) by 229 days.

(21) Appl. No.: 16/408,934

(22) Filed: May 10, 2019

(65) Prior Publication Data

US 2020/0356693 A1    Nov. 12, 2020

(51) Int. Cl.
  *G06F 21/62*    (2013.01)
  *G06F 21/60*    (2013.01)
  *G06F 21/40*    (2013.01)
  *G06F 21/35*    (2013.01)

(52) U.S. Cl.
  CPC .......... *G06F 21/6245* (2013.01); *G06F 21/35* (2013.01); *G06F 21/40* (2013.01); *G06F 21/604* (2013.01)

(58) Field of Classification Search
  CPC ...... G06F 21/6245; G06F 21/35; G06F 21/40; G06F 21/604
  See application file for complete search history.

(56) References Cited

U.S. PATENT DOCUMENTS

| | | | |
|---|---|---|---|
| 7,367,063 B1* | 4/2008 | O'Toole, Jr. .......... | G06F 21/554 713/183 |
| 7,506,198 B2 | 3/2009 | Shoam | |
| 8,683,188 B2* | 3/2014 | Jayaraman ............ | G06F 9/4401 713/2 |
| 9,417,886 B2 | 8/2016 | Satam et al. | |
| 2006/0021005 A1* | 1/2006 | Williams .............. | G06F 21/313 726/2 |
| 2006/0129848 A1* | 6/2006 | Paksoy ................. | H04W 12/03 713/193 |
| 2006/0236126 A1* | 10/2006 | Adams .................... | G06F 21/60 713/193 |
| 2009/0046419 A1 | 2/2009 | Drake et al. | |
| 2011/0076986 A1* | 3/2011 | Glendinning .......... | G06F 21/88 455/411 |
| 2012/0063026 A1 | 3/2012 | Juan et al. | |
| 2013/0007873 A1* | 1/2013 | Prakash .................... | G06F 1/26 726/18 |
| 2014/0250499 A1* | 9/2014 | Vercruysse .......... | H04L 9/3215 726/4 |
| 2014/0372743 A1* | 12/2014 | Rogers ................ | H04W 12/126 713/2 |

(Continued)

*Primary Examiner* — Joseph P Hirl
*Assistant Examiner* — Stephen T Gundry
(74) *Attorney, Agent, or Firm* — Larson Newman, LLP

(57) ABSTRACT

An information handling system with improved data security has a signal detector circuit to receive a signal interrupt from a plurality of signal interrupt sources, and an authentication timer circuit that starts measuring a configured time duration based upon the received signal interrupt. A scrambler module initiates data scrambling upon completion of the configured time duration.

20 Claims, 4 Drawing Sheets

(56) References Cited

U.S. PATENT DOCUMENTS

| | | | |
|---|---|---|---|
| 2015/0089221 A1* | 3/2015 | Taylor | H04W 12/08 |
| | | | 713/168 |
| 2017/0075699 A1* | 3/2017 | Narayanan | G06F 21/575 |
| 2017/0220802 A1* | 8/2017 | Huang | G06F 21/575 |
| 2017/0344438 A1* | 11/2017 | Bilgiday | G06F 21/71 |
| 2018/0054461 A1* | 2/2018 | Dubs | G06F 21/16 |
| 2018/0225230 A1* | 8/2018 | Litichever | G06F 21/82 |
| 2019/0013945 A1* | 1/2019 | Hamlin | H04W 12/06 |
| 2019/0065786 A1* | 2/2019 | Young | H04L 9/0891 |
| 2019/0138730 A1* | 5/2019 | Liu | G06F 21/575 |
| 2019/0287588 A1* | 9/2019 | Montero | G11C 8/20 |
| 2019/0294800 A1* | 9/2019 | Andrews | G06F 21/602 |
| 2019/0379656 A1* | 12/2019 | Gore | H04L 63/0815 |
| 2020/0014701 A1* | 1/2020 | Robison | H04L 63/105 |
| 2020/0034541 A1* | 1/2020 | Ballard | G06F 8/654 |
| 2020/0042059 A1* | 2/2020 | Kennedy | G06F 1/26 |
| 2020/0042710 A1* | 2/2020 | Liu | G06F 9/44505 |
| 2020/0053080 A1* | 2/2020 | Hamlin | H04L 63/083 |
| 2020/0252388 A1* | 8/2020 | Tran | H04L 63/105 |
| 2020/0252430 A1* | 8/2020 | Peacock | H04W 12/63 |
| 2020/0278873 A1* | 9/2020 | Hsu | G06F 11/3006 |
| 2020/0311008 A1* | 10/2020 | Saha | G06F 3/0604 |
| 2020/0314115 A1* | 10/2020 | Nabeesa | H04L 9/0825 |
| 2020/0320226 A1* | 10/2020 | Chitrak Gupta | G06F 21/78 |

* cited by examiner

APPARATUS AND METHOD FOR IMPROVING DATA SECURITY

FIELD OF THE DISCLOSURE

This disclosure generally relates to information handling systems, and more particularly relates to improving data security.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a signal detector circuit to receive a signal interrupt from a plurality of signal interrupt sources, and an authentication timer circuit that starts measuring a configured time duration based upon the received signal interrupt. A scrambler module initiates data scrambling upon completion of the configured time duration.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
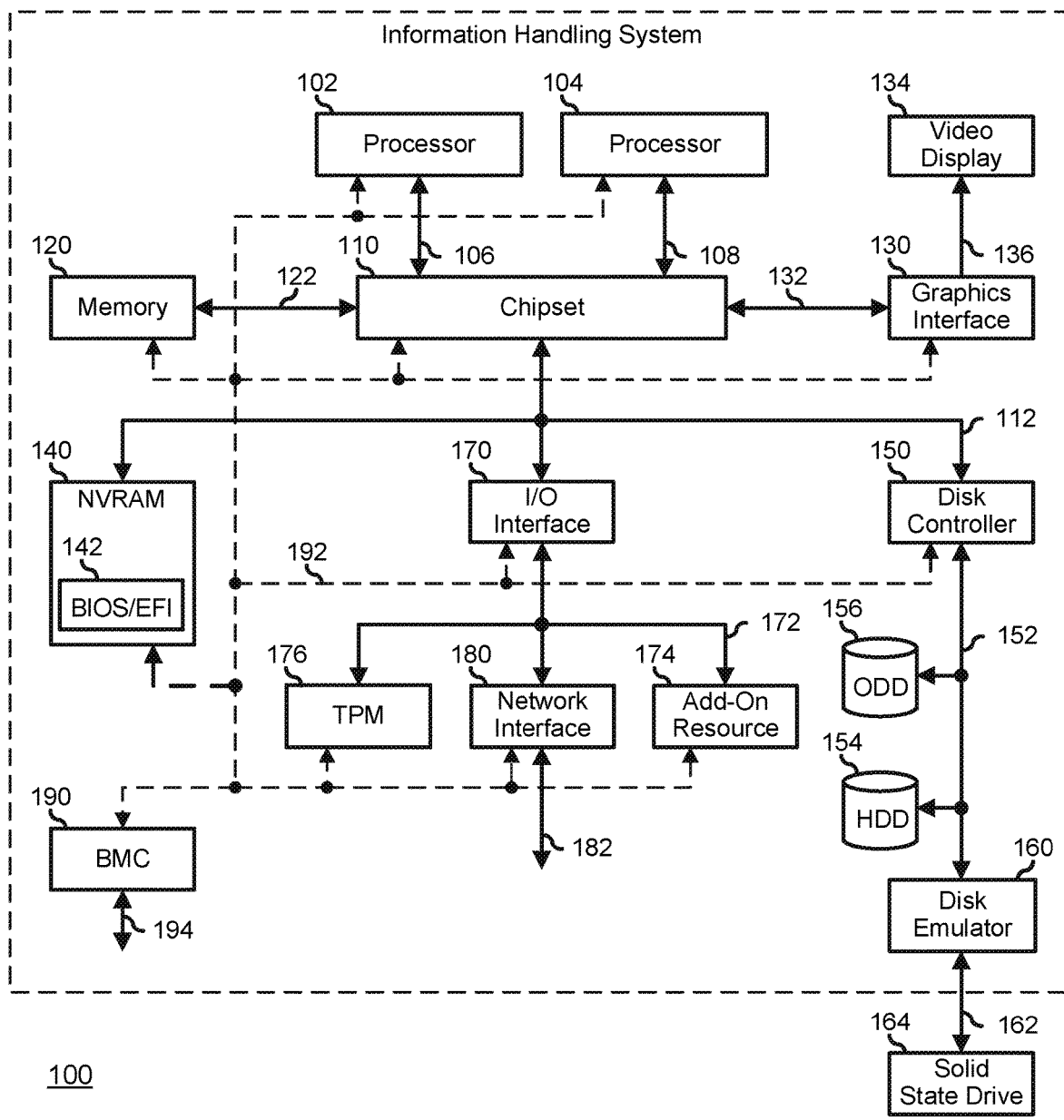
FIG. 1 is a block diagram of a generalized information handling system.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EH) module 142, disk controller 150, hard disk drive (HDD) 154, optical disk drive (ODD) 156, disk emulator 160 connected to solid state drive (SSI)) 164, an input/output (I/O) interface 170 connected to an add-on resource 174, a trusted platform module (TPM) 176, a network interface 180, and a baseboard management controller (BMC) 190. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (I)) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NW), a sound/video processing card, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface device 180 includes a NIC or host bus adapter (HBA), and an example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processors 102 and 104, which provides various management functions for information handling system 100. In an embodiment, BMC 190 may be responsible for granting access to a remote management system that may establish control of the elements to implement power management, cooling management, storage management, and the like. The BMC 190 may also grant access to an external device. In this case, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term baseboard management controller (BMC) may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface 192 that may include an inter-integrated circuit (I2C) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

In an embodiment, the BMC 190 implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RA-CADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated onto another element of the information handling system such as chipset 110, or another suitable element, as needed or desired. As such, BMC 190 can be part of an integrated circuit or a chip set within information handling system 100. BMC 190 may operate on a separate power plane from other resources in information handling system 100. Thus BMC 190 can communicate with the remote management system via network interface 194 or the BMC can communicate with the external mobile device using its own transceiver circuitry while the resources or elements of information handling system 100 are powered off or at least in low power mode. Here, information can be sent from the remote management system or external mobile device to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, information handling system may be one of many hundreds or thousands of other enterprise class processing systems in the datacenter. In such an environment, the information handling system may represent one of a wide variety of different types of equipment that perform the main processing tasks of the datacenter, such as modular blade servers, switching and routing equipment (network routers, top-of-rack switches, and the like), data storage equipment (storage servers, network attached storage, storage area networks, and the like), or other computing equipment that the datacenter uses to perform the processing tasks.

In an embodiment, multiple logout authentication credentials may be desirable to perfect a secured logout. In this embodiment, the secured logout may prevent data access by unauthorized users.

Figure 2:
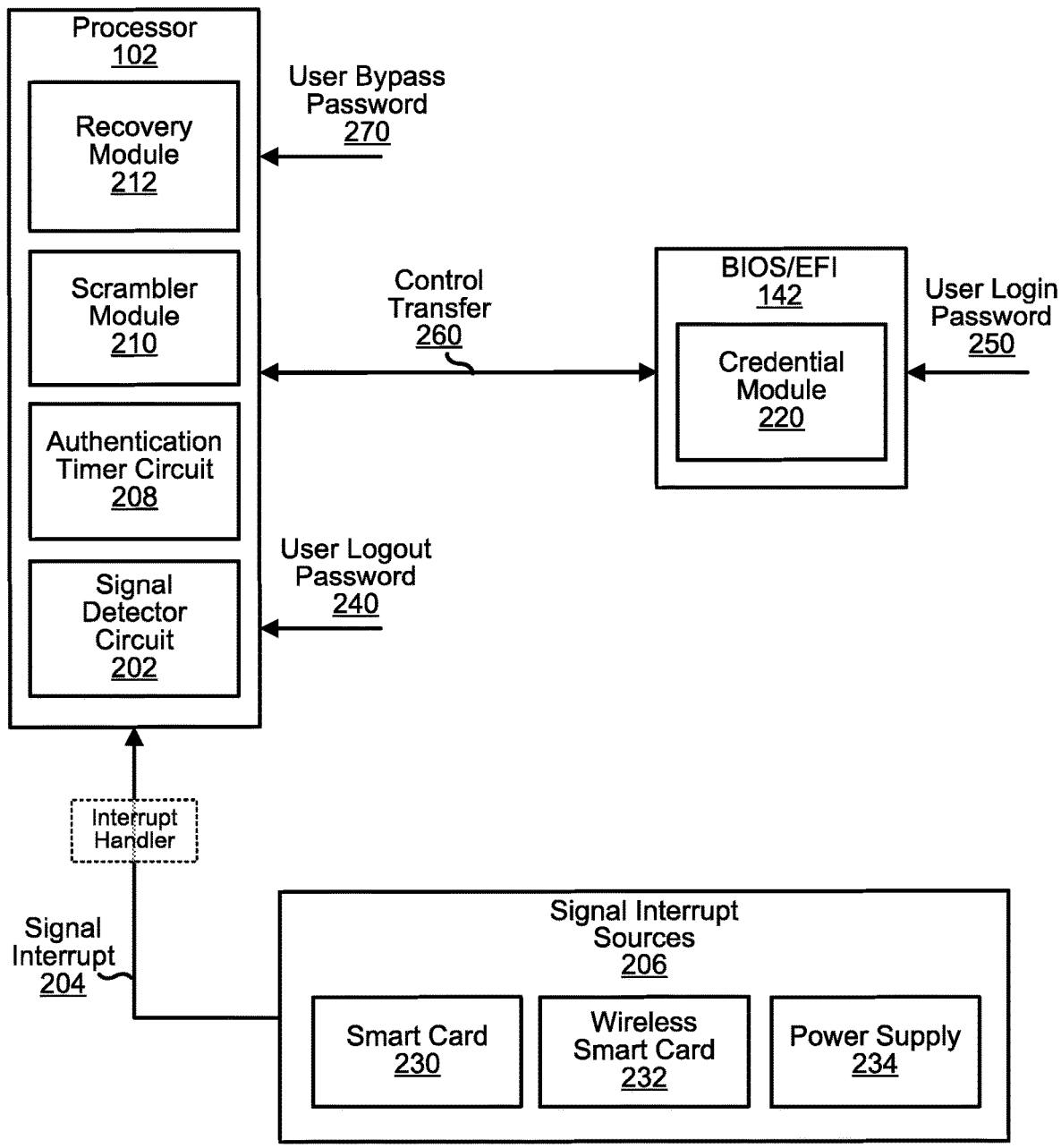
FIG. 2 is a block diagram of a portion of the information handling system supporting a secure logout from the information handling system upon completion of logout authentication credentials within a configured time duration, according to an embodiment of the present disclosure.

FIG. 2 shows a portion 200 of the information handling system 100 including processor 102 and BIOS/EFI 142. The processor may include a signal detector circuit 202 that receives a signal interrupt 204 from one or more signal interrupt sources 206. The processor may further include an authentication timer circuit 208, a scrambler module 210, and a recovery module 212. In an embodiment, an improved data security may be implemented by using the multiple logout authentication credentials to generate the secure logout. In this embodiment, the logout authentication credentials may refer to security identifications that may be required to properly log off from the information handling system or server system. For example, the multiple logout authentication credentials may include at least a combination of entering a user logout password and a physical removal of a smart card from the information handling system. In this example, the resulting secure logout may indicate that the data are not destroyed or at least not erased. However and in case of security breach where the multiple logout authentication credentials were not observed, a reboot is triggered and a login reauthentication may be required to access the server system. The login reauthentication may include reinstalling of the smart card, entering a user login credential, entering a recovery key, and the like. The login reauthentication, for example, may be implemented through a credential module 220 of the BIOS/EFI 142.

In an embodiment, different types of signal interrupt sources 206 may be derived from a physically installed or plugged smart card 230, a wireless connected wireless smart card 232, and or a plugged power supply 234. Furthermore, one or more of these signal interrupt sources may be combined with the entering of a user logout password 240 in order to complete the logout authentication credentials. In this embodiment, the processor 102 may dynamically configure the number of required logout authentication credentials to include different combinations of two or more logout authentication credentials. For example, the required logout authentication credentials include the entering of the user logout password 240 and the physical removal of the plugged smart card. In another example, the required logout authentication credentials include the entering of the user logout password and the detection of a low received signal strength indication (RSSI) power from the wireless smart card. In another example still, the required logout authentication credentials include the entering of the user logout credential, detection of the low RSSI power, and the unplugging or turning OFF of the power supply 234. In these examples, any incompletion of the required logout authentication credentials within a particular time period may generate an automated destruction of the data or the scrambling of the data to prevent unauthorized access. Furthermore, the incompletion of the required logout authentication credentials may require rebooting of the server system before any possible data recovery may be performed.

The smart card 230 may include a security chip that stores the security credential or identifications to gain access to the server system. For example, the smart card is physically installed to the server as a removable external device. In this example, an identification pin from the security chip of the smart card is detected and read by the processor. Upon verification of the security credential from the read identification pin, the smart card may be treated as login authentication credential to the server system. In an embodiment, the physical removal of the smart card from the server system may generate the signal interrupt 204 that may be received by the signal detector circuit 202. For example, the signal interrupt is similar to a system management interrupt of system management code that allows the server system to automatically take appropriate action. In this embodiment, the signal detector circuit may receive and identify the source of the system management interrupt before taking appropriate action.

The wireless smart card 232 may be connected to the server system through the NFC channel, BLE channel, or other wireless communication channel. For example, the wireless communication between the wireless smart card and the server system is established through the NFC channel. In this example, the established wireless communication may require a particular RSSI power level to maintain the wireless communication. In an embodiment and when the detected RSSI power level is below a configured threshold, this detection may generate the signal interrupt 204 to the signal detector circuit 202. In this embodiment, the signal detector circuit may identify the type or particular signal interrupt source that supplied the signal interrupt. Similarly, the unplugging of the power supply 234 may generate the signal interrupt indicating the physical disconnection of the power supply. In this case, the signal detector circuit may identify the particular signal interrupt source that supplied the signal interrupt. The different signal interrupt sources presented is for ease of illustration and different other sources such as biometrics may be used to complete the logout authentication credentials. In this case, the signal interrupt derived from the use of biometrics may be combined with the other signal interrupt sources described above in order to generate the secure logout.

The signal detector circuit 202 may include hardware circuit that is configured to receive the signal interrupt, for example, through an interrupt handler and to determine the particular signal interrupt source based on identification parameters corresponding to the signal source. The identification parameters may be generated by the interrupt handler. For example, the signal detector circuit receives the triggering signal through the interrupt handler on account of physical removal of the smart card 230 from the server. In this example, the signal detector circuit may determine the signal interrupt source from a particular identification parameter that may be associated with the signal interrupt. In this example still, an entry of user logout credential such as the user logout password 240 within the configured time period may complete the logout authentication credentials.

In a case where the entry of the user logout password is made after the lapse of the configured timed period, then the server system will go to reboot status that may require hand off of the server system control from the operating system to the BIOS. For example, the handoff to the BIOS provides a lock down mode to prevent unauthorized users from accessing the data. In this example and while in the lockdown mode, the user may be required to enter login authentication credentials such as user login password 250 and encryption keys to access and perform data recovery. In another example, the BIOS detect an improper handoff of the server system control from the operating system. In this other example, the BIOS detect security breach and enters into lock down mode or reboot status.

The authentication timer circuit 208 may include hardware circuit counter to measure elapsed time. In an embodiment, the authentication timer circuit may be configured to have different time durations corresponding to different types of signal interrupt sources. For example, upon receiving of the signal interrupt due to physical removal of the smart card 230, the counter is triggered to start its configured thirty seconds duration. That is, the configured time duration for the physical removal of the smart card is only thirty seconds. In another example, the counter is triggered to start its configured two hours duration when the received signal interrupt is due to detected low RSSI power level of the wireless smart card. In these examples, the non completion of the required logout authentication credentials after the completion of the corresponding configured time durations may generate the data scrambling or destruction of data.

In a case where the configured duration is yet to lapse such as when the physical removal of the smart card was only accidental, the completion of the required logout authentication credentials generate the secure logout from the server system. In this case, the secured logout disables the running of the counter and thereby stops the measurement of the configured time duration. In other embodiments and rather than going to secure logout mode, a particular user bypass password may be utilized to disable the effect of the initial signal interrupt due to unintentional physical removal of the smart card, and the like. In this other embodiment, the timer is also disabled and the server system goes back to its normal status or operating condition.

In an embodiment, the triggering of the counter to start its configured time duration may be based upon the different combinations of the triggering signal interrupt sources. For example, the triggering of the counter is initiated in response to receiving of the signal interrupts due to detection of the low RSSI power level from the wireless smart card and the physical removal of the smart card. In another example, the initial detection of the low RSSI power level initially activates the counter and the subsequent physical removal of the smart card resets the running of the counter to complete the configured time duration corresponding to the removal of the smart card which may be of very short time duration due to imminent security breach. In these examples, the different combinations of the signal interrupts may be used to trigger or reset the timer of the authentication timer circuit. In these examples still, the generation of the secure logout disables the running of the counter.

The scrambler module 210 may include hardware circuit that is configured to initiate scrambling of data before the operating system transfers control of the server system to the BIOS for reboot. In extreme circumstances, the scrambler module may be configured to initiate an irreversible instant erasure of data. The scrambler module may initiate the scrambling or instant erasure of data when the counter has completed its configured duration and there is an incomplete multiple logout authentication credentials. In an embodiment, the scrambling of data may utilize trusted platform module (TPM) that includes a passive component integrated within the information handling system. In this embodiment, the TPM may include a platform configuration registers (PCR) that store integrity measurements performed by the BIOS over different PCR indexes such as PCR indexes 0-4 for BIOS, ROM, and memory block registers, and PCR indexes 5-7 for operating system loaders.

In an embodiment, the stored integrity measurements cannot be overwritten until the reboot is performed at the BIOS. As such, the PCR scrambling or any changing of the stored integrity measurements values cannot be overwritten and may further require recovery encryption keys during the reboot to recover the scrambled data. In this embodiment, incompletion of logout authentication credentials after the lapse of the configured time duration may provide immediate protection during imminent security breach.

The recovery module 212 may include hardware circuit that is configured to recover the scrambled data upon reboot. The recovery module may also recover application or processes that may have been interrupted by the signal interrupt due, for example, to accidental physical removal of the smart card, unplugging of the power supply, and the like. In an embodiment and upon reboot to which the BIOS 142 transfers 260 to the operating system the control of the server system, the recovery module may utilize the entered encryption keys to recover from the data scrambling due to previous unsecured logout. In this embodiment, the encryption keys may be entered upon successful authentication of the user login password 250. In the case where the signal interrupt is due to accidental physical removal of the smart card and the like, a bypass password 270 may be entered in parallel with the reinstallation of the smart card to recover the application or processes that may have been interrupted. In an embodiment, the recovery module may be configured to send the control signal to the authentication timer circuit in order to disable the running of the counter and stopes the measuring of the configured time duration. In this embodiment, the server system goes back to its normal operation.

Figure 3:
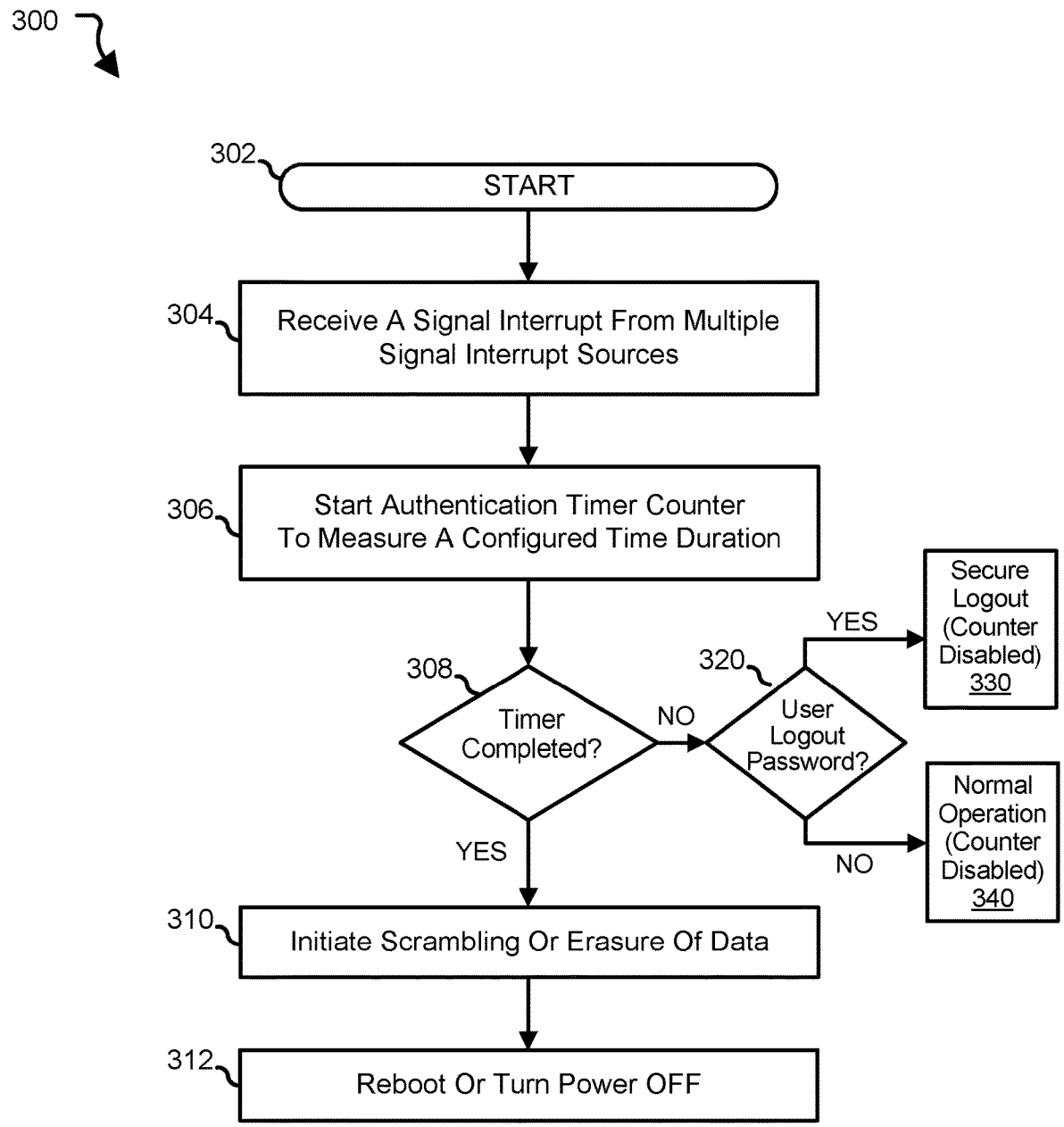
FIG. 3 is a flow chart showing a method of improving data security using multiple logout authentication credentials, according to an embodiment of the present disclosure.

FIG. 3 shows a method 300 of implementing improved data security using multiple logout authentication credentials, starting at block 302. At block 304, the signal detector circuit receives a signal interrupt from the signal interrupt sources. For example, the signal interrupt is due to physical removal of the smart card from the information handling system, due the detection of low RSSI power level from the wireless smart card, and the like. At block 306, the authentication timer circuit counter starts to run in response to the received signal interrupt. In an embodiment, the authentication timer may be configured to be of various durations such as one hour, two hours, one day, and the like, based upon the type of the received signal interrupt signal. At block 308, determining whether the counter has completed its configured time duration. At block 310 and upon completion of the configured time duration, the scrambler module performs the PCR scramble, erasure, or destruction of data. That is, the server system goes on reboot status at block 312 and the operating system handshakes with the BIOS to transfer the control of the server system. In this case, login authentication credentials and encryption keys may be required to perform data recovery.

At block 320 when the configured time duration is yet to lapse, the processor may receive the user logout password 240 or the user bypass password 270. At block 330 and when it is determined that the user entered the secure logout password, the logout authentication credentials are completed and the operating system transfers the control to the BIOS on account of the secure logout. In an embodiment, the secure logout disables running of the counter and the configured time duration does not elapse. At block 340 and when it is determined that the user entered the user bypass password, the recovery module may detect the reinstallation of the smart card, plugging of the power control, and the like, and sends the control signal to the authentication timer circuit to disable the running of the counter. In this case, the server system goes back to its normal operation 340.

Figure 4:
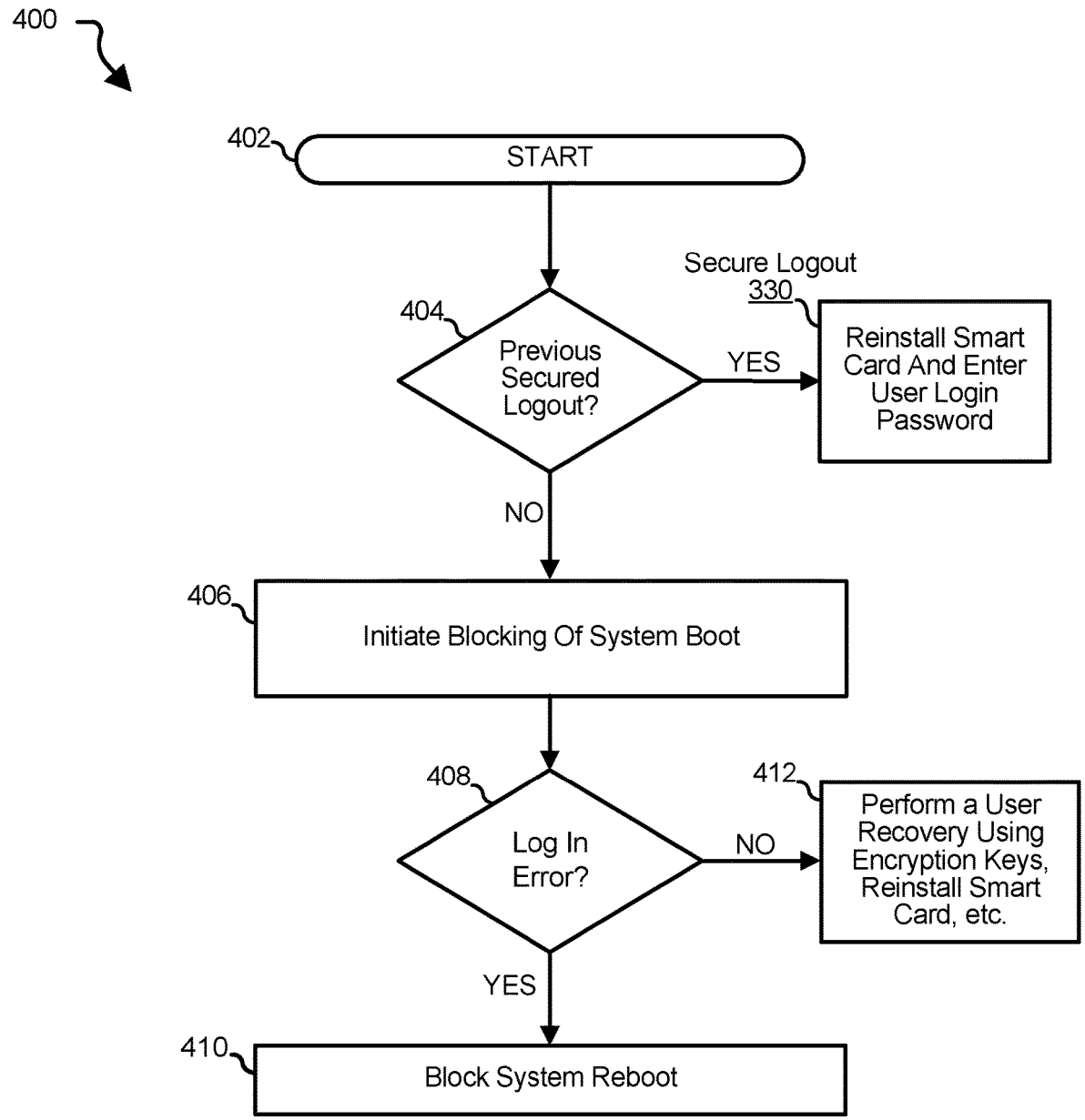
FIG. 4 is a flow chart showing a method of rebooting the information handling system, according to an embodiment of the present disclosure.

FIG. 4 shows a method 400 of rebooting the server system using login authentication credentials, starting at block 402. At block 404, determining whether the reboot status is due to previous secured logout that includes completion of the logout authentication credentials within the configured time duration. At block 406 and when it is determined that there was no previous secured logout, the information handling system initiates blocking of the system boot. For example and at block 408, the blocking of the system boot at the BIOS may include counting the number of times that the user has entered a wrong password within a time period. When it is determined that the user has exceeded the threshold error, then at block 410 the reboot of the server system is blocked. Otherwise and at block 412, a user recovery may be performed upon proper access of the server system. In this case, the entry of the encryption keys together with the reinstallation of the removed smart card, and the like, may be required to recover the scrambled data.

At block 330 when it is determined that there was previous secure logout, the reboot may require reinstallation of the smart card, entry of the user login password, and the like, to access the server system. In this case, there is no need for the encryption keys because the data were not scrambled nor erased.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware.

An information handling system can also include one or more computer-readable medium for storing machine-executable code, such as software or data. Additional elements of an information handling system can include one or more storage devices that can store machine-executable code, one or more communications ports for communicating with external devices, and various I/O devices, such as a keyboard, a mouse, and a video display. An information handling system can also include one or more buses operable to transmit information between the various hardware elements.

In accordance with various embodiments of the present disclosure, the methods described herein may be implemented by software programs executable by a computer system. Further, in an exemplary, non-limited embodiment, implementations can include distributed processing, object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system having improved data security, comprising:
   a signal detector circuit to receive a signal interrupt from a plurality of signal interrupt sources;
   an authentication timer circuit that starts measuring a configured time duration based upon the received signal interrupt;
   a scrambler circuit that initiates data scrambling upon completion of the configured time duration; and
   a processor to initiate a hand off of control of the information handling system to a basic input/output system (BIOS) upon the completion of the configured time duration,
   the BIOS to detect an improper hand off, and
   in response to the detected improper hand off, the BIOS to enter into a lock down mode to prevent unauthorized users from accessing the scrambled data.

2. The information handling system of claim 1, wherein the signal interrupt sources include a physical removal of a smart card from the information handling system, a detection of low received signal strength indicator power level from a wireless smart card, and unplugging of a power supply.

3. The information handling system of claim 2, wherein different signal interrupt sources include different configured time durations.

4. The information handling system of claim 1, wherein the data scrambling includes platform configuration register scrambling.

5. The information handling system of claim 1, wherein a completion of logout authentication credentials within the configured time duration generates a secure logout from the information handling system.

6. The information handling system of claim 5, wherein the completion of the logout authentication credentials includes a physical removal of a smart card and an entry of a user logout password within the configured time duration.

7. The information handling system of claim 5, wherein the secure logout disables running of a counter to stop the measuring of the configured time duration.

8. The information handling system of claim 1, wherein an entry of a user bypass password within the configured time disables running of a counter to stop the measuring of the configured time duration.

9. The information handling system of claim 8 further comprising recovery circuitry that performs recovery of applications interrupted by the signal interrupt.

10. A method comprising:
    receiving a signal interrupt from a plurality of signal interrupt sources;
    measuring a configured time duration based upon the received signal interrupt;
    scrambling data stored in an information handling system upon completion of the configured time duration;
    initiating a hand off control of the information handling system from a processor to a basic input/output system (BIOS) upon the completion of the configured time duration;
    detecting, by the BIOS, an improper hand off; and
    in response to the detected improper hand off, entering into a lock down mode to prevent unauthorized users from accessing the scrambled data.

11. The method of claim 10, wherein the signal interrupt sources include a physical removal of a smart card from a server system, a detection of low received signal strength indicator power level from a wireless smart card, and unplugging of a power supply.

12. The method of claim 11, wherein each of the signal interrupt sources corresponds to a different configured time duration.

13. The method of claim 10, wherein the data scrambling includes platform configuration register scrambling.

14. The method of claim 10, wherein a completion of logout authentication credentials within the configured time duration generates a secure logout from a server system.

15. The method of claim 14, wherein the completion of the logout authentication credentials includes a physical removal of a smart card from a server system and an entry of a user logout password within the configured time duration.

16. The method of claim 10, wherein an entry of a user bypass password within the configured time duration disables running of a counter to stop the measuring of the configured time duration.

17. The method of claim 16 further including recovering of applications interrupted by the signal interrupt.

18. A method comprising:
    receiving a signal interrupt indicating a physical removal of a smart card from a server system;
    starting a counter of a configured time duration based upon the received signal interrupt;
    scrambling data upon lapse of the configured time duration;
    initiating a hand off control of the information handling system from a processor to a basic input/output system (BIOS) upon the completion of the configured time duration;
    detecting, by the BIOS, an improper hand off; and
    in response to the detected improper hand off, entering into a lock down mode to prevent unauthorized users from accessing the scrambled data.

19. The method of claim 18, wherein an entry of a user logout password within the configured time duration generates a reboot of the server system.

20. The method of claim 19, wherein the reboot includes transfer of server system control from an operating system to a basic input and output system.

* * * * *